United States Patent Office 3,364,161
Patented Jan. 16, 1968

3,364,161
SILICONE RUBBER COMPOSITION CONTAINING CORROSION INHIBITING CURING AGENT
Coleman Nadler, Philadelphia, Pa., assignor to the United States of America as represented by the Secretary of the Navy
No Drawing. Continuation-in-part of application Ser. No. 347,957, Feb. 27, 1964. This application Jan. 19, 1967, Ser. No. 610,722
10 Claims. (Cl. 260—18)

ABSTRACT OF THE DISCLOSURE

The subject disclosure relates to an improved corrosion inhibiting curing agent system for room temperature vulcanizing silicone polymer sealants that are used to encapsulate and pot electronic equipment. It contemplates the use of an amino alkylalkoxysilane and a submicroscopic pyrogenic silicon dioxide powder with the room temperature vulcanizing silicone and its organo metallic salt vulcanizing agent preventing the corrosion of the electrical wiring and circuitry of the metallic salt.

---

The invention described herein may be manufactured and used by or for the Government of the United States of America for governmental purposes without payment of any royalties thereon or therefor.

This is a continuation-in-part of patent application, Ser. No. 347,957, filed Feb. 27, 1964, now abandoned.

This invention relates to a new and improved process for the sealing of electrical equipment with silicone compositions capable of vulcanizing at room temperature to form elastomeric products and to improved curing systems for sealing such equipment.

Silicone rubber stocks based on siloxane polymers with fillers, vulcanizing agents, cross-linking agents, pigments, catalysts and other additions are well known and commercially available. Room temperature vulcanizing (hereinafter "RTV") silicone rubber stocks have an advantage over other types of elastomeric products in that they are in fluid form which can be poured in or around objects and which can be converted to a solid elastomeric form at room temperature following addition of a curing or vulcanizing agent. An RTV silicone rubber stock consists essentially of a linear siloxane polymer having a molecular formula $R^1R^1_2SiO(R_2SiO)_xSiR_2R^1$ wherein each $R_2$ is a monovalent hydrocarbon radical, each $R^1$ is either hydrogen, an alkoxy radical or a hydroxy radical grouping and $x$ has an average value of from 50 to 10,000.

Organo-metallic salts from the class consisting of dibutyltin dilaurate, lead octoate and stannous octoate effect a condensation reaction of the $R^1$ groups in these silicones at room temperature and effect a vulcanization equivalent to that obtained with peroxides and heat. This RTV silicone rubber is used in the electrical field for potting or encapsulating aircraft and missile electrical and electronic equipment. It serves to improve the operational reliability of this equipment by insulating the copper wires against corrosion and contamination from the various fluids present in the ambient environment. These elastomers possess outstanding electrical insulating properties and can be used at high temperatures up to 600° F.

However, it was discovered that the presence of the organo-metallic salt curing agent in the silicone rubber contributed to the corrosion of the copper electrical wires being encapsulated. The organic acid portion of these curing agents react with the copper wires in the presence of moisture to form a copper salt and copper oxide corrosion products which may cause a malfunction in the equipment, particularly where small diameter wires are involved.

It is one object of this invention to introduce a novel curing system for providing adequate working life and also preventing the corrosion tendency of RTV silicone rubber stocks cured with organo-metallic curing agents.

Another object of this invention is to provide a novel method for inhibiting corrosion in electrical equipment either encapsulated or potted with an RTV silicone polymer.

These and further objects and features of the invention will become more apparent from the following description.

It has become common practice to employ organo-metallic salts to effect a cure at room temperature of hydroxy end-blocked organo polysiloxane polymers. Unexpectedly, I have discovered that I am able to effect such a cure to the solid, elastic state by employing a combination of ingredients which retard the corrosive effect of the organo-metallic salts without sacrificing the working life of the silicone polymer. The means whereby this room temperature cure is obtained is due to the concomitant presence of both an amino-alkylalkoxysilane and a submicroscopic, pyrogenic silicon dioxide powder which has been prepared in a hot gaseous environment of 1100° C. and which possess an extremely large surface area for adsorbing the silane in sufficient quantity. This silicon dioxide powder material which is produced under the trade name of CAB-O-SIL is 99% silica on a moisture free basis, has a particle size of .015 micron and has a surface area of 175–225 m.²/g. It was entirely unexpected and in no way could it have been predicted that the combined presence of these two ingredients could alleviate the corrosive activity of the organo-metallic salt curing agent for the reason that attempts to employ these highly reactive and moisture sensitive amino-alkylalkoxysilanes in the curing mixes for silicone polymers heretofore caused an acceleration of the curing process whereby a useful working life and low viscosity which was practical for the intended use of these polymers could not be obtained. The amino-alkylalkoxysilanes alone, when added to the silicone polymers effect a rapid curing action by virtue of their basisity and ability to condense through their reactive alkoxy end groups.

I have now discovered that the CAB-O-SIL will cause the adsorption of the aminosilane onto its surface and will enable it to be compatible in an organo-metallic salt curing system for RTV silicone polymers. However, when the cured RTV electrical sealant is exposed to a corrosion producing environment such as high humidity, the amino-alkylalkoxysilane is released from the surface of the silica and reacts with the copper wire to form a protective monomolecular film thereon. The amino-alkylalkoxysilane reacts with the acidic portion of the organo-metallic curing agent to form an amide or salt. The amide or salt products of this reaction also form a protective monomolecular film on the copper whereby it is protected from corrosive attack.

Suitable for use in this curing system are the amino-alkylalkoxysilanes represented by the structural formula:

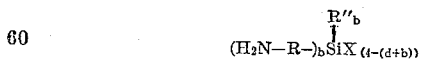

wherein $R''$ represents an alkyl group such as methyl, ethyl, propyl, butyl and the like, or an aryl group such as phenyl, naphthyl, tolyl and the like, X represents an alkoxy group such as methoxy, ethoxy, propoxy groups and the like, R is a divalent saturated aliphatic or saturated or unsaturated cyclic hydrocarbon radical, and preferably having a carbon chain of from 3 to 4 carbons, (b) is an integer having a value of from 0 to 2 and preferably a value of from 0 to 1, (d) is an integer having a value of from 1 to 2, and the sum of $(d+b)$ is not greater than 2. Illustrative of such amino-alkylalkoxysilanes are gamma-aminopropyltriethoxysilane, gamma-aminopropyltripropoxysilane, gamma-aminopropylmethyldiethoxysilane, gamma-aminopropylethyldiethoxysilane, gamma - aminopropylphenyldiethoxysilane, delta-aminobutyltriethoxysilane, delta - aminobutylmethyldiethoxysilane, delta-aminobutylethyldiethoxysilane, delta-aminobutylphenyldiethoxysilane, gamma-aminobutyltriethoxysilane, gamma-aminobutylmethyldiethoxysilane and the like.

In order that those skilled in the art may better understand how the present invention may be practiced, the following example is given by way of illustration and not by way of limitation. Parts are by weight.

Gamma-aminopropyltriethoxysilane and CAB-O-SIL ($SiO_2$) which has been dried for 16 hours at 225° F. are mixed together in a 3:2 weight ratio respectively. 133 parts by weight of this silicon dioxide-amino silane ester mixture is thoroughly mixed into 600–800 parts by weight of a dimethyl polysiloxane oil which has 250 parts by weight of copper phthalocyanine powder dispersed therein. 100 parts by weight dibutyltin dilaurate are added at the rate of 1 cc./min. dropwise to the mixture and the entire composition is blended to form a smooth paste. The presence of the copper phthalocyanine powder inhibits by an adsorption effect the gamma-aminopropyltriethoxysilane adsorbed on the surface of the CAB-O-SIL from reacting with the organic metallic salt and coagulating the paste. This paste is ready for use and can be exposed and employed over a long period of time (up to one year) so long as it is kept essentially water free.

It is imperative that the dibutyltin dilaurate be added to the dimethyl polysiloxane oil after the gamma-aminopropyltriethoxysilane has been adsorbed onto the surface of the CAB-O-SIL; otherwise the curing effect of the system will be destroyed. Moreover, in the absence of CAB-O-SIL, the gamma-aminoproyltriethoxysilane would result in a working time (period during which viscosity of material is still suitable for potting or encapsulating) of less than 18 minutes. Whereas dibutyltin dilaurate produces a working time of 160 minutes. However, in the presence of CAB-O-SIL, this equivalent amount of gamma-aminopropyltriethoxysilane permits a working time of 170 minutes as is noted in the table hereinunder.

13–26 parts of the paste is mixed with 1000 parts of the RTV silicone polymer wherein it reaches a Shore "A" durometer hardness of 50 in 20–24 hours at 77° F. The RTV silicone polymer was a hydroxy endblocked diorganosiloxane having the general formula $$HOR_2SiO(R_2SiO)_xSiR_2OH$$

where R is a methyl radical and $x$ is 250 to 800. The polymer had a viscosity of approximately 50,000 centipoises at 25° C.

Tests were conducted on RTV silicone polymers cured with the curing composition of this invention and compared with an RTV silicone polymer cured with dibutyltin dilaurate. Results are given in the following table.

|  | Curing Agent—Cured 8–10 Days at 77° F. | |
|---|---|---|
|  | Dibutyltin Dilaurate | The Composition of Example I |
| Working Time, minutes | 160 | 170 |
| Tensile Strength, p.s.i. | 700 | 500 |
| Ultimate Elongation, percent | 90 | 90 |
| Shore "A" Durometer Hardness, pts. | 58 | 57 |
| Water Immersion 3 days at 140° F.: |  |  |
| Change in Weight, percent | +1.1 | +1.2 |
| Volume, percent | +2.2 | +2.3 |
| Hardness, pts | −6 | −5 |

| | Change in Weight, Percent; Volume, Percent; Shore "A" Durometer Hardness, pts. | | | | | |
|---|---|---|---|---|---|---|
|  | W | V | H | W | V | H |
| Oven Aged, days/ 450° F. (1" Cubes): |  |  |  |  |  |  |
| 7 days | −2.5 | −5.5 | −18 | −2.2 | −4.7 | −16 |
| 21 days | −4.3 | −7.5 | −18 | −3.3 | −6.2 | −14 |
| 42 days | −7.0 | −12.0 | −12 | −4.5 | −8.4 | −10 |
| Copper Wire Corrosion (30 days at 95-98% RH, 120° F.). | Heavy green-brown corrosion film, wire etched. | | | Clean and shiny—no corrosion film. | | |

| Volume Resistivity (ohm-cm.) | After Cure | Oven Aged 70 hrs./ 400° F. | After Cure | Oven Aged 70 hrs./ 400° F. |
|---|---|---|---|---|
| At 77° F. | 2.5×10¹⁵ | 2.1×10¹⁵ | 9.5×10¹⁴ | 2.5×10¹⁵ |
| At 300° F. | 3.2×10¹⁴ | 2.5×10¹³ | 2.0×10¹³ | 2.6×10¹³ |
| After 40 days at 95% RH, 120° F.— Volume Resistivity at 77° F. | 1.4×10¹⁵ | | 7.5×10¹⁵ | |

It will be noted that the RTV silicone polymer cured with the composition of Example I possessed superior corrosion resistant properties to the silicone polymer cured with dibutyltin dilaurate alone.

Having thus described my invention and a certain embodiment thereof which serves as an illustration and not as a limitation, I would have it understood that various changes in the details, materials and arrangement of steps which have been herein described and illustrated in order to explain the nature of the invention, may be made by those skilled in the art within the principle and scope of the invention as expressed in the appended claims.

I claim:

1. An improved curing composition for RTV silicone polymers, characterized by the ability to prevent the corrosion of metals encapsulated by the silicone polymers, said composition consisting essentially of the following constitutents:

| Constituent: | Parts by weight |
|---|---|
| Copper phthalocyanine | 250–500 |
| Dimethyl polysiloxane oil | 600–800 |
| A mixture consisting of an aminoalkylalkoxysilane of the general formula | 133 |

wherein R is a divalent saturated aliphatic or saturated or unsaturated cyclic hydrocarbon radical having a chain of at least 3 carbons and wherein nitrogen is attached to at least a third carbon removed from silicon, R" represents a hydrocarbon group selected from the class consisting of methyl, ethyl, propyl, butyl, phenyl, naphthyl, tolyl, X represents an alkoxy group selected from the class consisting of methoxy, ethoxy and propoxy and $(b)$ is an integer having a value of 1 to 2, $(d)$ is an integer having a value of from 1 to 2, and the sum of $(d+b)$ is not greater than 2, adsorbed on the surface of pyrogenic silicon dioxide powder.

An organo-metallic salt selected from the group consisting of dibutyltin dilaurate, stannous octoate and lead octoate ___ 100

2. A curing composition according to claim 1 wherein the amino-alkylalkoxysilane is gamma-aminopropyltriethoxysilane.

3. A curing composition according to claim 1 wherein the organo-metallic salt is dibutyltin dilaurate.

4. The cured composition obtained from a mixture of ingredients comprising (a) a linear, fluid polysiloxane, polymer of the general formula $$R'R_2SiO(R_2SiO)_xSiR_2R'$$

wherein each $R_2$ is a monovalent hydrocarbon radical, each $R'$ is selected from the group consisting of hydrogen, alkoxy radicals and hydroxy radicals and $x$ has an average value of from 50 to 10,000, (b) copper phthalocyanine, (c) dimethyl polysiloxane oil, (d) an amino-alkylalkoxysilane of the general formula $$(H_2N-R-)_d\underset{\underset{R''_b}{|}}{Si}X_{(4-(d+b))}$$

wherein R is a divalent saturated aliphatic or saturated or unsaturated cyclic hydrocarbon radical having a chain of at least 3 carbons and wherein nitrogen is attached to at least a third carbon removed from silicon, R'' represents a hydrocarbon group selected from the class consisting of methyl, ethyl, propyl, butyl, phenyl, naphthyl, tolyl, X represents an alkoxy group selected from the class consisting of methoxy, ethoxy and propoxy and (b) is an integer having a value of 1 to 2, (d) is an integer having a value of from 1 to 2, and the sum of (d+b) is not greater than 2, and amino-alkylalkoxysilane being adsorbed on the surface of pyrogenic silicon dioxide powder, and (e) an organo-metallic salt selected from the group consisting of dibutyltin dilaurate, stannous octoate and lead octoate.

5. A cured composition according to claim 4 wherein the aminoalkylalkoxysilane is gamma - aminopropyltriethoxysilane.

6. A cured composition according to claim 4 wherein the organo-metallic salt is dibutyltin dilaurate.

7. The process for obtaining a composition of matter which can be converted at room temperature to the cured solid elastic state and which is non-corrosive to a metal encapsulated therein, which process comprises forming a mixture of ingredients comprising (a) a linear, fluid polysiloxane polymer of the general formula $$R'R_2SiO(R_2SiO)_xSiR_2R'$$

wherein each $R'$ is a monovalent hydrocarbon radical, each $R'$ is selected from the group consisting of hydrogen, alkoxy radicals and hydroxy radicals and $x$ has an average value of from 50 to 10,000, (b) copper phthalocyanine, (c) dimethyl polysiloxane oil, (d) an amino-alkylalkoxysilane of the general formula $$(H_2N-R-)_d\underset{\underset{R''_b}{|}}{Si}X_{(4-(d+b))}$$

wherein R is a divalent saturated aliphatic or saturated or unsaturated cyclic hydrocarbon radical having a chain of at least 3 carbons and wherein nitrogen is attached to at least a third carbon removed from silicon, R'' represents a hydrocarbon group selected from the class consisting of methyl, ethyl, propyl, butyl, phenyl, naphthyl, tolyl, X represents an alkoxy group selected from the class consisting of methoxy, ethoxy and propoxy and (b) is an integer having a value of 1 to 2, (d) is an integer having a value of from 1 to 2, and the sum of (d+b) is not greater than 2, and amino-alkylalkoxysilane being adsorbed on the surface of pyrogenic silicon dioxide powder, and (e) an organo-metallic salt selected from the group consisting of dibutyltin dilaurate, stannous octoate and lead octoate.

8. The process as in claim 7 in which the amino-alkylalkoxysilane is gamma-aminopropyltriethoxysilane.

9. The process as in claim 7 in which the organo-metallic salt is dibutyltin dilaurate.

10. A composite article comprising a copper substrate encapsulated with the cured composition of claim 4.

References Cited
UNITED STATES PATENTS

| 3,203,969 | 8/1965 | Pines et al. | 260—46.5 |
| 3,247,281 | 4/1966 | Gagliardi | 260—18 |

DONALD E. CZAJA, *Primary Examiner.*

M. I. MARQUIS, *Assistant Examiner.*